Figure 1:
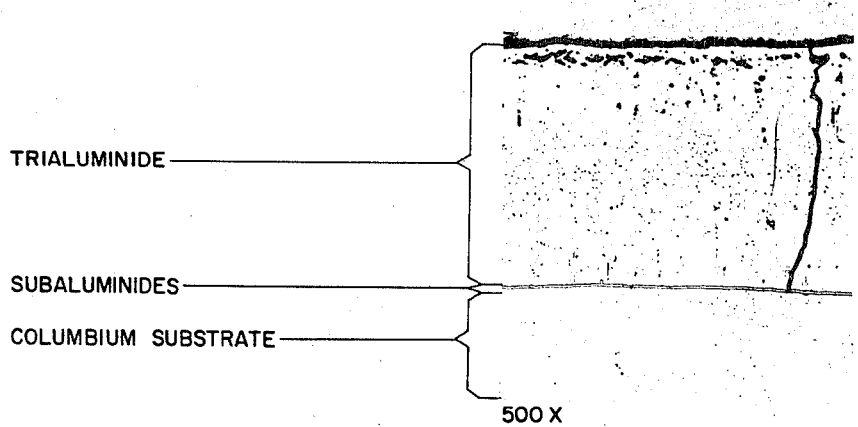

United States Patent

[11] 3,578,743

| [72] | Inventors | Elihu F. Bradley<br>West Hartford, Conn.;<br>Edwin S. Bartlett, Worthington; Horace R.<br>Ogden; Robert I. Jaffee, Columbus, Ohio |
|---|---|---|
| [21] | Appl. No. | 791,880 |
| [22] | Filed | Jan. 13, 1969 |
| [45] | Patented | May 18, 1971 |
| [73] | Assignee | United Aircraft Corporation<br>East Hartford, Conn.<br>Continuation of application Ser. No.<br>502,650, Oct. 22, 1965, now abandoned. |

[54] ALUMINUM COATED COLUMBIUM BASE ALLOYS
20 Claims, 6 Drawing Figs.

[52] U.S. Cl. .................................................. 29/194,
                                                                29/198
[51] Int. Cl. ........................................... B32b 15/18
[50] Field of Search ........................................... 75/174;
                                                        29/194, 198, 197

[56] References Cited
UNITED STATES PATENTS

| 2,819,960 | 1/1958 | Bomberger .................. | 75/174U |
| 2,882,146 | 4/1959 | Rhodin ........................ | 75/174 |
| 3,078,554 | 2/1963 | Carlson ....................... | 29/197U |
| 3,081,530 | 3/1963 | Wlodek ....................... | 29/194 |
| 3,186,070 | 1/1965 | Oxx ............................. | 29/197X |
| 3,216,806 | 11/1965 | Samg et al. ................. | 29/198X |
| 3,219,474 | 11/1965 | Priceman .................... | 29/197 |
| 2,819,960 | 1/1958 | Bomberger .................. | 75/174UX |
| 2,882,146 | 4/1959 | Rhodin ........................ | 75/174 |

Primary Examiner—Hyland Bizot

ABSTRACT: This invention provides protective coatings for columbium alloys. The coatings comprise columbium aluminide modified by titanium and one or more of the following comodifiers Cr-, V-, Mo-, and Mo-Ta. The coatings can be provided by coating with aluminum a substrate consisting of columbium alloyed with these modifiers. The modified columbium aluminide coatings may remain on the substrate on which they are produced, or they can be removed from the original substrate and applied to other Cb-alloy substrates. Exemplary of the protective coatings of this invention are (a) a coating consisting essentially of columbium aluminide modified by 7 percent of Ti and 9 percent Mo, (b) a coating consisting essentially of columbium aluminide modified by 7 percent of Ti and 4 percent of V, (c) a coating consisting essentially of columbium aluminide modified by 8 percent of Ti and 4 percent of Cr, and (d) a coating consisting essentially of columbium aluminide modified by 8 percent of Ti, 11 percent of Ta, and 11 percent of Mo.

PHOTOMICROGRAPH IN PLAIN LIGHT OF
TRIALUMINIDE COATING OVER UNALLOYED Cb.

PHOTOMICROGRAPH IN POLARIZED LIGHT
OF TRIALUMINIDE COATING OVER UNALLOYED Cb.

INVENTORS
ELIHU F. BRADLEY
EDWIN S. BARTLETT
HORACE R. OGDEN
ROBERT I. JAFFEE

BY
*Finnegan & Henderson*
ATTORNEYS

TRIALUMINIDE

SUBALUMINIDES

Cb—13Ti SUBSTRATE

500X

PHOTOMICROGRAPH IN PLAIN LIGHT OF MODIFIED
TRIALUMINIDE ON Cb—13Ti SUBSTRATE, SHOWING
EQUIAXED TRIALUMINIDE STRUCTURE.

PHOTOMICROGRAPH IN PLAIN LIGHT OF TRIALUMINIDE
COATING OVER Cb-20Ta-15W-5Mo SUBSTRATE (AS-COATED).

FIG. 5

500X

PHOTOMICROGRAPH IN POLARIZED LIGHT OF TRIALUMINIDE COATING OVER Cb-20Ta-15W-5Mo SUBSTRATE (AS-COATED).

FIG. 6

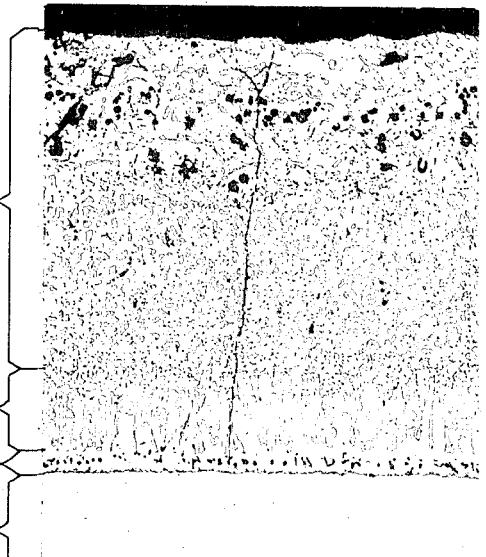

- TRIALUMINIDE MATRIX CONTAINING DISPERSED SUBALUMINIDES
- TRIALUMINIDE-SUBALUMINIDE INTERFINGERED LAYER
- SUBALUMINIDES
- Cb-20Ta-15W-5Mo SUBSTRATE

500X

PHOTOMICROGRAPH IN PLAIN LIGHT OF TRIALUMINIDE COATING OVER Cb-20Ta-15W-5Mo SUBSTRATE, AFTER OXIDATION AT 2200°F FOR 100 HOURS.

INVENTORS
ELIHU F. BRADLEY
EDWIN S. BARTLETT
HORACE R. OGDEN
ROBERT I. JAFFEE

BY Finnegan & Henderson
ATTORNEYS

ALUMINUM COATED COLUMBIUM BASE ALLOYS

This application is a continuation of Ser. No. 502,650, Oct. 22, 1965.

This invention relates to novel coatings for columbium-base alloys that will protect the base metal or substrate from oxidation in high-temperature environments and to a method for creating such coatings.

More particularly, this invention relates to titanium-modified columbium aluminide coatings for columbium-base alloys in which the aluminide portion of the coating is created by methods, such as vapor deposition (particularly pack-cementation), electrophoretic deposition, and the like. The invention also particularly relates to a method for obtaining vapor deposition of such titanium-modified aluminide coatings on columbium-base materials to produce a protective surface layer or zone over such materials that provides an oxidation-resistant coating at high temperatures, such as, for example, temperatures up to at least 2200° F. in air, and even higher for short exposure times.

The principal limitation in gas turbine technology today is the maximum turbine inlet temperature. The maximum turbine inlet temperature is, in turn, restricted by the maximum temperature that turbine blades and vanes are able to withstand without danger of failure. Formerly, the best available high-temperature alloys were nickel and cobalt base "superalloys," but critical structural components, such as turbine blades and vanes, made from such alloys are limited to maximum operating temperatures of between 1600° and 1900° F.

For many years it has been generally known that the high-temperature strength properties of metals are closely related to their melting points. In general, metals having high melting points are capable of forming alloys having high strength at high temperatures.

The need for structural material at temperatures in excess of those attainable with existing structural materials has stimulated interest in the metals having the highest melting points, which are the refractory metals, particularly, chromium, columbium, vanadium, hafnium, tantalum, molybdenum, and tungsten.

Molybdenum was once considered the chief candidate for use as a base metal in high-temperature alloys. At the elevated temperature service conditions needed, however, molybdenum oxidizes, and the oxide formed is volatile. Once the oxidation reaction sets in, it tends to progress rapidly until molybdenum is consumed at a catastrophic rate.

As an alloy base material for high-temperature service, columbium ultimately offers more promise, and considerable interest has been shown in its development as a structural alloy base for use in high-temperature environments. Among the most important physical qualities of columbium as an alloy base are its high melting temperature (about 4475° F.) and its low neutron-capture cross section. By virtue of these properties, columbium is, therefore, potentially useful for such applications as fast aircraft, space flight vehicles, and nuclear reactors.

Moreover, columbium is inherently a soft, ductile, readily fabricable material, and although it becomes too weak for practical structural uses at temperatures above 1200° F., it can be readily strengthened for use at much higher temperatures by alloying with various other metals, and particularly by alloying with other refractory metals. Columbium is also highly reactive as a metal in that it dissolves large quantities of oxygen and also nitrogen, upon exposure to air or to atmospheres containing even small amounts of these elements at relatively modest temperatures.

Although columbium oxidizes rapidly at high temperatures, in contrast to molybdenum, which oxidizes catastrophically by fusion and sublimation of its oxide, columbium oxide does not volatilize at the service temperatures contemplated (up to at least 2500° F.). It is thus potentially possible to prevent oxygen attack on Cb-base substrates by coating the substrate, and if premature localized coating failure should occur, restricting such failure and oxygen attack to the localized site. Further advantages offered by Cb- over Mo-base alloys are that Cb-base alloys are relatively more ductile and workable at low temperatures and that columbium has a lower density than molybdenum thus making possible the production of lighter weight products from columbium.

The history of columbium alloy technology has demonstrated the incompatibility of achieving oxidation resistance and high-temperature strength through alloying alone Since the major uses for Cb-base alloys are as structural components in high-temperature applications, it is apparent that useful classes of high-temperature Cb- alloys will require protective coatings in their normal high-temperature oxidizing environments.

A particularly important potential area of use for Cb-base alloys as dictated by economic and technological factors is in structural materials, such as turbine blades for jet engines, which are designed for exposure to oxidizing and corrosive combustion gas environments at temperatures of about 2000° F. (a temperature that clearly establishes utility for these alloys) and higher. Concomitantly, such alloys must be able to resist mechanical stresses for appreciable periods of time at these high temperatures and in these environments.

About 500° F. is the maximum operating temperature to which Cb-base alloys can be subjected for extended times in the uncoated condition without serious oxidation, and at temperatures much above 500° F. the oxidation problem becomes acute.

The art has previously recognized certain oxidation-resistant intermetallic coatings as exhibiting particular potential for protecting refractory metals (e.g., columbium, molybdenum, tantalum, and tungsten) from oxidation at high temperatures. In general, the more effective of these intermetallic coatings are silicides, aluminides, and beryllides of the base metal.

In considering coatings for the refractory metals, both the coating and substrate materials importantly affect performance of the coated systems. For example, an aluminide coating over columbium may perform quite differently from one over molybdenum with the difference in performance attributable to the substrate rather than to the coating. As an additional confirmation of the importance of the substrate, some species of coating that are reliably protective over certain of the refractory metals are ineffective over columbium and are susceptible to failure on columbium at high temperatures. Coating and substrate must thus be coordinated and treated as an integrated system. Success with a particular coating on a particular refractory metal base does not mean the coating will be successful when used on a different refractory metal base.

Several methods, such as, flame or plasma torch spraying, slurry application techniques, electrophoretic deposition, hot pressure bonding, and vapor deposition have been used for applying intermetallic coatings to Cb-base alloys. A vapor deposition process that can be used advantageously to achieve some types of coatings is the so-called pack-cementation process, in which the object or substrate to be coated is surrounded by a particulate pack mixture containing, for example, (1) the metal to be reacted with (or deposited on) the substrate to be coated (e.g., silicon, aluminum, beryllium), (2) an activator or energizer (usually a halide salt, such as NaCl, KF, $NH_4Cl$, and the like), and (3) an inert filler material (e.g., $Al_2O_3$, $SiO_2$, BeO, MgO, and the like).

This mixture, held in a suitable container (such as, a steel box, a graphite boat or a refractory oxide crucible), is then heated to the desired coating temperature in a prescribed atmosphere and held for a length of time sufficient to achieve the desired coating. When conducted properly, the pack-cementation process may be used to produce controlled-thickness coatings on columbium, the major portions of which will be compounds, such as, $CbAl_3$, $CbSi_2$, and the like.

The more favorable coatings for columbium (columbium aluminides, silicides, and beryllides) possess certain intrinsic deficiencies such as rapid oxidation failure at "low" temperatures (about 1100° to 1600° F. and particularly in the vicinity of about 1300° F.) or at "high" temperatures (about 2000° F. and above). Perhaps, the most serious deficiency of existing coatings for columbium, however, is their propensity for failing at localized sites.

Aluminide coatings on columbium and its structural alloys (i.e., coatings of the $CbAl_3$ type) possess excellent intrinsic oxidation resistance at temperatures above about 1600° F., and are thus a coating type of major interest for Cb-base substrates. Such aluminide coatings, however, are susceptible to premature failure at localized sites through the full range of elevated temperatures and are particularly prone to consumption by rapid oxidation at "low" temperatures (below about 1600° F.). This characteristic of aluminide coatings is sometimes called "the aluminide pest phenomenon." Modification of aluminide coatings is thus highly desirable to impart sufficient longevity and reliability to give to them a utility they do not normally possess.

In view of the foregoing, it is a primary object of this invention to provide novel and improved Ti-modified columbium aluminide coating compositions that will protect Cb-base substrates from the effects of oxidation at temperatures up to at least about 2500° F. and that will achieve substantially uniform and homogeneous Ti-modified aluminide coatings that exhibit equiaxed grain structures and high resistance to failure at localized sites.

Another object of this invention is to provide new and improved Ti-modified columbium aluminide coatings for Cb-base substrates that overcome the aluminide pest phenomenon characterized by rapid consumption of aluminide coatings through oxidation at elevated temperatures from about 1100° to 1600° F., and that also overcome the tendency of columbium aluminide coatings to fail by local defecting throughout the full range of elevated temperatures, thereby providing coatings that give excellent oxidation resistance at temperatures up to at least 2500° F.

Further objects of this invention are to provide a novel and improved coating for Cb-base substrates that in addition to providing resistance to simple thermal oxidation will also be protective under other reasonably expected conditions of use, and to this end, the protective coatings of this invention achieve good resistance to thermal cycling, thermal shock, formation of defects, and high velocity gas erosion.

Other objects of this invention are to provide for columbium and its alloys:

1. a coating that in nominal thicknesses of about 3 mils or more is capable of providing protection for exposures to high-temperature oxidizing environment for times in excess of 100 hours at temperatures of up to at least about 2500° F.;

2. a coating that exhibits good resistance to thermal shock failure;

3. a coating that displays excellent resistance to the formation of defects at all temperatures of exposure;

4. a coating that achieves significant resistance to high velocity gas erosion; and 5. a coating that is relatively insensitive to substrate geometry effects, or the shape of the substrate on which it is applied.

A further object of this invention is to provide a new and improved Ti-modified aluminide coating for columbium and its alloys that includes a sublayer or subzone formed from subaluminides of the substrate and in which this subzone acts as an oxidation penetration barrier to give backup protection to the substrate if a defect in the primary surface coating should occur.

A still further object of this invention is to provide a new and improved method for coating Cb-base substrates with a columbium aluminide coating by vapor deposition (pack-cementation) of a aluminide coating on a Cb-base substrate that has been previously modified by alloying with titanium, or by alloying with titanium and a metal selected from the group consisting of chromium, vanadium, and molybdenum, to create thereby a substantially homogeneous and uniformly modified columbium aluminide coating. Such coatings have an equiaxed structure and maintain their uniformity and homogeneity on even intricately shaped parts and at the edges and corners of parts.

Additional objects and advantages of the invention will be set forth in part in the description that follows, and in part will be obvious from the description, or may be learned by practice of the invention, the objects and advantages being realized and attained by means of the compositions, articles, methods, and processes particularly pointed out in the appended claims.

To achieve the foregoing objects, and in accordance with its purpose, this invention in one embodiment includes an article of manufacture having good resistance to oxidation that comprises a substrate consisting essentially of from 13 to 45 percent by weight of titanium and the balance essentially columbium, the article having an oxidation-resistant surface zone consisting essentially of columbium aluminide modified by a titanium content substantially proportionate by weight to titanium content of the substrate.

In a broader embodiment, this invention also comprehends a new and improved article of manufacture having high-temperature oxidation resistance and resistance to cyclic fatigue failure, which article comprises a substrate consisting essentially of at least 55 percent by weight of columbium and from 13 to 45 percent by weight of titanium, the balance of the substrate being at least one metal modifier selected from the group consisting of vanadium, chromium, and molybdenum or a combination of molybdenum and tantalum, the maximum of each selected metal modifier by weight being 6 percent of vanadium, 13 percent of chromium, 35 percent of molybdenum, and 27 percent of tantalum; the article having a thermal cyclic failure resistant, defect resistant, and broad range oxidation-resistant coating or surface zone consisting essentially of columbium aluminide modified by titanium in an amount substantially proportionate to the weight of titanium in the substrate and by the selected metal modifier in an amount substantially proportionate to the weight of selected metal modifier in the substrate. The substrates within the scope of this invention contain tantalum only when molybdenum is also present.

From the foregoing description of the invention, it will be clear that comprehended within its scope is a Cb-base substrate consisting essentially of columbium and titanium without any metal modifier; that is, the V, Cr, Mo and Mo-Ta additions are all optional.

In a preferred embodiment, the invention also includes an article having good resistance to oxidation at elevated temperatures which comprises a substrate consisting essentially of columbium and from 23 to 55 percent by weight of an alloying addition consisting essentially of titanium and one or more metal modifiers selected from the group consisting of vanadium, chromium, molybdenum, and a combination of molybdenum and tantalum, the article having an oxidation-resistant coating consisting essentially of a surface zone of columbium aluminide modified by the alloying addition in an amount substantially proportionate by weight to the amount of alloying addition that is in the substrate; the titanium content of the substrate being a maximum of 45 percent by weight, and the substrate containing molybdenum when tantalum is present, the molybdenum to tantalum weight ratio in such cases being between about 1:2 and 2:1.

Further in accordance with its purpose, this invention embraces a method for producing a coated metal article having resistance to oxidation at high temperatures, the metal article comprising a substrate consisting essentially of at least 55 percent by weight of columbium and from 13 to 45 percent by weight of titanium, the substrate also optionally containing one or more metal modifiers selected from the group consisting of chromium, vanadium, molybdenum, and a combination of molybdenum and tantalum, the maximum of each selected metal modifier by weight being 6 percent of vanadium, 13 percent of chromium, 35 percent of molybdenum, and 27 percent of tantalum; which method comprises contacting the substrate with a powdered pack of a finely ground source of aluminum and a small amount of a volatilizable halide salt as active ingredients, and an inert filler, heating the substrate and powdered pack for a time period sufficient to cause volatilization of the halide salt and to produce deposition of aluminum on the surface of the substrate, thereby effecting the creation of an exterior surface zone on the substrate consisting essentially of columbium aluminide modified by titanium in an amount substantially proportionate to the weight of titanium in the substrate and by the selected metal modifier in an amount substantially proportionate to the weight of selected metal modifier in the substrate. In accordance with this method, when tantalum is present in the substrate, molybdenum will also be present in the substrate, in a Mo:Ta weight ratio between about 1:2 and 2:1, and preferably in an amount substantially equivalent by weight to tantalum content. The substrates coated by this method include alloys in which none of the metal modifier is present.

In accordance with the invention, it has been found that oxidation resistance of the coated article is enhanced most effectively and most preferred results are obtained when at least one of chromium, vanadium, or molybdenum are included in the Cb-base substrate together with titanium.

Best results with titanium alone are obtained with substrates containing from 23 to 40 percent by weight of titanium, and the balance essentially columbium.

When the alloying addition to columbium in the substrate includes both titanium and chromium, best results are obtained when the titanium content is from 20 to 35 percent by weight and chromium content is from 6 to 13 percent by weight [i.e., a Cb-(20 to 35)Ti-(6 to 13)Cr alloy]. Similarly, when the alloying addition comprises titanium and vanadium, best results are obtained when titanium content is from 15 to 25 percent and vanadium content is up to 6 percent by weight [i.e., a Cb-(15 to 25)Ti-($\leq$6)V alloy]. Finally, when the alloying addition consists essentially of titanium and molybdenum, best results are obtained when titanium content is from 15 to 30 percent and molybdenum content is from 15 to 30 percent by weight [i.e., a Cb-(15 to 30)Ti-(15 to 30)Mo alloy].

When the alloying addition includes vanadium, chromium, or molybdenum in addition to titanium, the total alloying addition present may range as high as 55 percent by weight of the substrate, but titanium content should not exceed 35 percent by weight. When the alloying addition includes tantalum and molybdenum (and optionally vanadium and chromium) in addition to titanium, the total alloying addition may be as high as 65 percent by weight of the substrate (including up to 25 percent by weight of the substrate of Ti). When Mo and Ta are both present, their total can constitute up to 40 percent, by weight, of the substrate.

This invention, as described above, contemplates the production of modified columbium aluminide coatings on Cb-base alloy substrates which comprise columbium aluminide and the modifying elements described above; the coating being produced by substantially proportionate modification of columbium aluminide by the modifying elements present in the substrate (i.e., Ti, Ti-Cr, Ti-V, etc.).

The invention, however, in its broadest form, lies in the improved coatings themselves and is not limited to their application to the particular substrates previously described. Thus, it is contemplated by this invention that the modified columbium aluminide coatings disclosed and taught herein can be applied to Cb-base alloy substrates generally. For example, such coatings can be formed in thin sheets or foils and cladded to structural Cb- alloy substrates (such as, for example Cb-20Ta-15W-5Mo and the like). Another means for applying the modified columbium aluminide coatings of this invention to diverse types of Cb-base alloy substrates is by producing such coatings on the preferred substrates of this invention, i.e., Cb-Ti, Cb-Ti-V, etc., removing the coating from the substrate by grinding, machining, or the like, and then applying it to another Cb- alloy substrate by flame spraying, plasma spraying or the like.

By these procedures, the coatings of this invention can be applied to any Cb-base alloy, and this invention in its broadest form contemplates such uses.

The chemical composition of the coatings of this invention, particularly in terms of the amount of modifying elements present therein generally will depend upon the content of such elements in the substrate that is aluminized to produce the coating in question. Thus aluminizing a Cb-13Ti substrate produces, by substantially proportionate modification, a modified columbium aluminide coating containing about 4.3 percent by weight of the coating of Ti-modifier.

Correspondingly, 15 percent by weight of Ti in the substrate will, on aluminizing, produce columbium aluminide coatings modified by about 5 percent by weight of the coating of Ti; 20 percent by weight Ti in the substrate produces about 6.3 percent by weight of Ti-modifier in the coating; 23 percent by weight Ti in the substrate produces coatings containing about 7 percent by weight Ti; 25 percent by weight Ti in the substrate produces coatings containing about 8 percent by weight of Ti-modifier; 30 percent by weight Ti in the substrate produces about 9 percent by weight of Ti-modifier in the coating; 35 percent by weight Ti in the substrate produces about 10 percent by weight of Ti-modifier in the coating; 40 percent by weight Ti in the substrate produces about 11.4 percent by weight of Ti-modifier in the coating; and 45 percent by weight Ti in the substrate produces about 13 percent by weight of Ti-modifier in the coating.

In like manner 13 percent by weight Cr in the columbium-base alloy substrate, on aluminizing in accordance with this invention, produces columbium aluminide coatings modified by about 7 percent by weight of the coating of Cr; 6 percent by weight Cr in the substrate produces coatings containing about 4 percent by weight of Cr-modifier; up to 6 percent by weight V in the substrate produces coatings containing up to about 5 percent by weight of V-modifier; 15 percent by weight Mo in the substrate produces coatings containing about 8 to 9 percent by weight of Mo-modifier; 30 percent by weight Mo in the substrate produces coatings containing about 17 percent by weight of Mo-modifier in the coating; 35 percent by weight Mo in the substrate produces coatings containing about 20 percent by weight of Mo-modifier; 27 percent by weight Ta in the substrate produces about 16 percent by weight of Ta-modifier in the coating, and 40 percent by weight of Mo and Ta, in the aggregate, in the substrate produces coatings containing up to about 24 percent by weight of Mo-Ta-modifier, in the aggregate.

As previously set forth, conventional aluminide coatings on structural columbium alloy substrates are prone to rapid consumption by oxidation at "low" (from about 1100° to 1600° F.) temperatures, i.e., "the aluminide pest phenomenon." They are also highly susceptible to local defecting at "high" (about 2000° F. or higher) temperatures. At the latter temperature the rapid oxidation mechanism that occurs, though different from the pest phenomenon, is similar in its harmful result.

Quite surprisingly, but nonetheless in accordance with the invention, it has been discovered that if aluminide coatings for columbium and its structural alloys are modified through substrate modifications of:

1. titanium (TI), or
2. titanium and vanadium (Ti-V), or
3. titanium and chromium (Ti-Cr), or
4. titanium and molybdenum (Ti-Mo), or
5. titanium, molybdenum and tantalum (Ti-Mo-Ta), or
6. various combinations of the above (such as Ti-V-Cr, Ti-V-Mo, Ti-V-Mo-Ta, and the like)

within the ranges taught for these respective elements, the deleterious effects of both the "low" temperature aluminide pest phenomenon and "high" temperature local defecting are substantially overcome.

The titanium-modified aluminide coatings of this invention are thus particularly outstanding in their ability to protect columbium and its alloys from oxidation under a wide variety of conditions of use and at temperatures ranging from 500° F. up to about 2500° F. These coatings possess distinctly superior oxidation resistance and superior defect insensitivity up to at least about 2500° F., and they overcome and counteract the tendency of Ti-free aluminide coatings on Cb-base substrates to fail at critical temperatures of from 1100° to 1600° F., and at 2000° F. or above.

Coating failure at "low" temperatures occurs by rapid disintegration of the coating to a fine, intermetallic powder that spalls from the surface of the substrate, leaving it unprotected against subsequent oxidation attack. Although the mechanism or mechanisms by which low-temperature powdering occurs have not been established, two possible mechanisms that have been suggested by research observations are:

1. selective grain boundary (or other preferred directional) oxidation of the coating, and
2. localized defecting of the coating that allows oxidation of the substrate, or the subcoating, to occur with consequent voluminous oxide growth at the coating-substrate interface. This latter mechanism results in excessive pressure buildup at the interface and consequent spalling of unoxidized coating.

Figure 2:
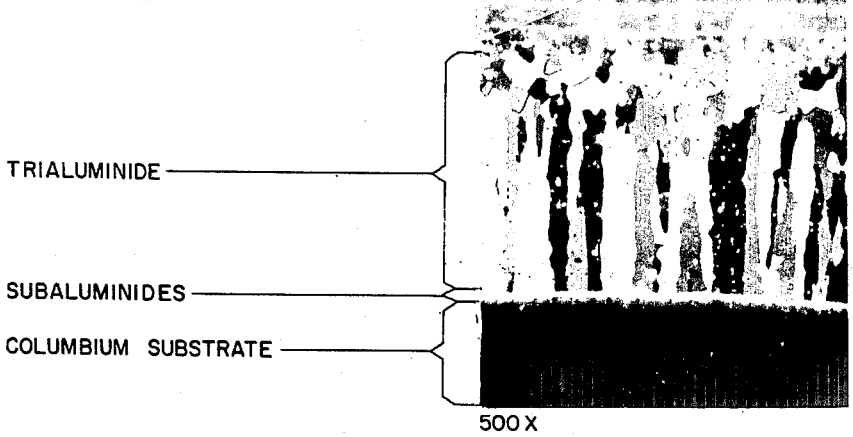

In accordance with this invention, it has been discovered that the most harmful effects of both mechanisms can be prevented by changes in coating chemistry and structure. Premature localized failures in aluminide coatings result primarily from stresses induced by thermal expansion mismatch and characteristically such failures occur by fracture of coatings along grain boundaries. The normal aluminide structure, as shown in FIGS. 1 and 2 (photomicrographs of a trialuminide coating over unalloyed columbium taken in plain and polarized light, respectively, and showing the structure enlarged 500 times), consists predominantly of columnar grains with axes oriented normal to the substrate surface.

As is well known, grain boundaries represent areas of atomistic imperfection that can be highly susceptible to failure by chemical or mechanical forces. Columnar grains in which grain boundaries run roughly parallel to each other provide a structure that offers the least resistance to failure by either grain boundary oxidation or local defecting—the principal failure mechanisms, as described above. A more desirable structure, better able to resist stress-induced failure, is an equiaxed-grain structure in which no direct planar route of structural weakness persists between the substrate (or subcoating) and environment.

An additional undesirable feature of unmodified aluminide coatings for columbium is that the normal subaluminides that form between coating and substrate are the nonoxidation-resistant forms—$Cb_2Al$ and $Cb_3Al$. It has been observed that upon failure of coatings, such as $CbAl_3$, which are susceptible to local-defect failure, fracture of the coating terminates in the subcoating region. When the subaluminide is nonoxidation-resistant, no barrier to rapid oxidation or contamination of the substrate is provided. In accordance with the invention, however, formation of oxidation-resistant subaluminide phases (e.g., phases richer in aluminum than $Cb_2Al$, or those that are propitiously modified with other elements) substantially improves oxidation performance by providing "backup" oxidation resistance, or an effective safety factor that enhances coating performance.

It has been discovered that during reaction of pack-cementation atmospheres with columbium alloy substrates, chemical elements present in the substrate usually react on a substantially proportionate weight basis with the coating atmosphere. This results in a distinct and controllable modification of coating chemistry.

For example, during pack aluminizing of columbium, the predominant resulting coating phase is $CbAl_3$. When, however, a Cb-base alloy, such as, Cb-20Ta-15W-5Mo (additions expressed in percent by weight), is pack-aluminized, a coating is formed that is structurally similar to $CbAl_3$ but which has a chemical analysis corresponding to the compound $Cb_{0.73}Ta_{0.12}W_{0.09}Mo_{0.063}$, or (Cb-20Ta-15W-5Mo) $Al_3$. Thus, by chemically modifying the substrate upon which pack-cementation-reacted coatings are formed, the resulting coating can also be modified in chemical composition.

In accordance with the instant invention, it has been further discovered that modifications of columbium aluminide coatings (particularly $CbAl_3$ coatings) with titanium (Ti), or titanium and one or more metals selected from the group: chromium, vanadium, molybdenum, and a combination of molybdenum-tantalum (Ti-Cr, Ti-V, Ti-Mo and Ti-Mo-Ta), are particularly advantageous in improving the principal deficiencies of unmodified $CbAl_3$ coatings.

Thus, in accordance with the invention, specific elemental modifiers within prescribed ranges of alloy content may be use to homogeneously and uniformly modify columbium aluminide coatings and thereby significantly improve coating performance over that attainable with unmodified columbium aluminide coatings.

For a clearer understanding of the invention, specific examples are set forth in the description that follows. These examples are merely illustrative and are not to be understood as limiting the scope and underlying principles of the invention in any way.

In accordance with the invention, the Cb-base alloy substrates set forth below, most of which consist essentially of columbium and various amounts of alloying elemental additions of Ti, Ti-V, Ti-Cr, Ti-Mo and Ti-V-Cr, were prepared as set forth in the description that follows the enumeration of the alloys.

For illustrative and comparison purposes a number of the alloys listed are not within the scope of the invention; however, alloys 5, 8, 9, 10, 11, 12, 13, and 15, below, are all true examples of the alloys of this invention. The composition of each alloy is given in percent by weight of each element present (excluding incidental impurities).

Alloy 1
Columbium 100%
Alloy 2
Tantalum 20%
Tungsten 15%
Molybdenum 5%
Columbium 60%
Alloy 3
Titanium 3%
Columbium 97%
Alloy 4
Titanium 12%
Columbium 88%
Alloy 5
Titanium 23%
Columbium 77%
Alloy 6
Titanium 50%
Columbium 50%
Alloy 7
Titanium 75%
Columbium 25%
Alloy 8
Titanium 15%
Molybdenum 15%
Columbium 70%
Alloy 9
Titanium 15%
Molybdenum 30%
Columbium 55%
Alloy 10
Titanium 25%
Molybdenum 15%
Columbium 60%
Alloy 11
Titanium 25%
Molybdenum 30%
Columbium 45%
Alloy 12
Titanium 25%
Chromium 6%

| | |
|---|---|
| Columbium | 69% |
| Alloy 13 | |
| Titanium | 25% |
| Chromium | 13% |
| Columbium | 62% |
| Alloy 14 | |
| Titanium | 25% |
| Chromium | 29% |
| Columbium | 46% |
| Alloy 15 | |
| Titanium | 25% |
| Vanadium | 6% |
| Columbium | 69% |
| Alloy 16 | |
| Titanium | 50% |
| Vanadium | 6% |
| Columbium | 44% |
| Alloy 17 | |
| Titanium | 50% |
| Vanadium | 12% |
| Columbium | 38% |
| Alloy 18 | |
| Titanium | 15% |
| Chromium | 13% |
| Vanadium | 6% |
| Columbium | 66% |
| Alloy 19 | |
| Titanium | 15% |
| Chromium | 29% |
| Vanadium | 6% |
| Columbium | 50% |
| Alloy 20 | |
| Titanium | 25% |
| Chromium | 30% |
| Vanadium | 6% |
| Columbium | 39% |
| Alloy 21 | |
| Vanadium | 12% |
| Columbium | 88% |
| Alloy 22 | |
| Hafnium | 33% |
| Columbium | 67% |

The compositions of additional Alloys 23 through 29 are set forth in percent by weight in Table 6 (reproduced hereinafter) and will not be repeated here. This additional group of Alloys 23 through 29 is included primarily to show the effect of tantalum modification on columbium aluminide coatings and will be discussed in more detail later.

The foregoing alloys were consolidated by standard nonconsumable arc-melting in a chilled copper crucible, using a tungsten electrode, in a high-purity helium atmosphere. The as-cast buttons were machined to provide a number of nominal ⅜ × ¼ × ⅛-inch rectangular tabs. Sharp corners and edges were rounded off by filing. Before coating, all substrate specimens were chemically polished using a nitric-hydrofluoric-acetic acid solution.

Aluminide coatings were then applied to the substrates using a pack-cementation process, in which the substrate specimens to be coated were imbedded in an aluminizing pack of the following mixture:

15 percent by weight of aluminum powder 3 percent by weight of $NH_4Cl$ powder, and 82 percent by weight of $Al_2O_3$ powder.

These pack, contained in covered graphite crucibles, were then subjected to a temperature of about 2000° F. (although other elevated temperatures above the vaporization point of the halide can, of course, be used) in an argon atmosphere for times of from 3 to 13 hours. In general, the resulting modified aluminide coatings were microscopically sound, homogeneous, and uniform. They ranged from 3 to 7 mils in thickness. Coatings that were modified with elements electronegative with respect to columbium, such as Cr, Mo, and W, formed at relatively high rates, and were somewhat thicker than the desired nominal thickness of about 5 mils.

As described below, the compositions of the modified aluminide coatings created by such treatment were determined or controlled by substrate composition. The improved behavior displayed by such modified coatings, however, primarily resulted from the chemical modification achieved and was dependent upon proportions of modifying ingredients in the coating. The proportions of modifiers in each coating were determined in turn largely by the proportions of elemental modifiers in the particular substrate.

The Ti-modified columbium aluminide coatings created by the above-described process steps were evaluated by the following tests:

1. Cyclic oxidation tests in air at:
   a. 1300° F, and
   b. 2200° F.
2. Metallographic examination of the coating structures:
   a. as coated,
   b. after 1300° F. oxidation, and
   c. after 2200° F. oxidation.
3. Electron-beam microprobe analysis to determine the chemical composition of the coatings.

Oxidation tests were conducted in ambient air without forced airflow. During testing, specimens, supported on refractory oxide boats, were inserted in an electrically heated muffle furnace preset at the desired temperature. Specimens were removed periodically from the furnace, and cooled to room temperature for visual examination and weighing, after which they were returned to the furnace for additional oxidation exposure.

The time intervals for cyclic exposures were as set forth in Table 1 below:

TABLE 1

| | Time for cycle in hours | Cumulative time in hours |
|---|---|---|
| Cycle: | | |
| 1 | 1.5 | 1.5 |
| 2 | 1.5 | 3.0 |
| 3 | 1.5 | 4.5 |
| 4 | 15.5 | 20.0 |
| 5 | 5.0 | 25.0 |
| 6 | 25.0 | 50.0 |
| 7 | 25.0 | 75.0 |
| 8 | 25.0 | 100.0 |

Testing at each temperature was discontinued upon failure of the specimen or after a total of 100 hours oxidation without failure was achieved.

Metallographic examination of the coatings prior to testing revealed very significant structural features, particularly when modified with preferred amounts of titanium or titanium and one or more metal modifiers selected from the group: vanadium, chromium, and molybdenum, all in accordance with the invention.

Figure 3:
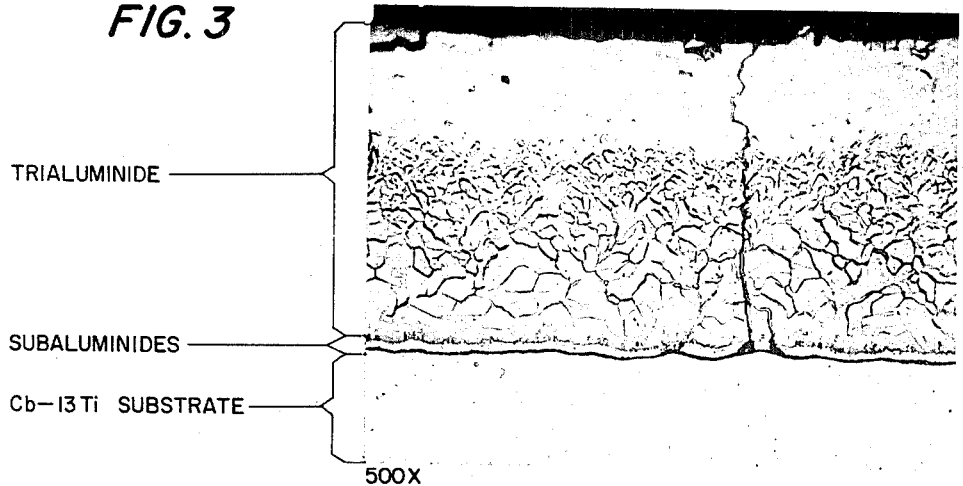

Whereas normal $CbAl_3$ reaction coatings possess continuous columnar grains (see FIGS. 1 and 2, photomicrograph of trialuminide coating over unalloyed columbium enlarged 500 times), chemical modification of this type coating with titanium, vanadium, or chromium (or combinations of these) in amounts greater than about 6 percent resulted in complete dissociation of such continuous columnar grains and effected a desirable equiaxed-type grain structure. Such an equiaxed structure is shown in FIG. 3, which is a photomicrograph enlarged 500 times of columbium trialuminide modified by an addition of about 13 percent by weight of titanium.

Other important microstructural features observed in the coatings were the presence of fine second-phase particles. Tungsten—and molybdenum—rich phases were particularly abundant in columbium trialuminides modified by W and Mo.

Figure 4:

The thin subaluminide region between columbium trialuminide coatings comodified with Mo and Ta and the respective substrates from which such coatings were formed was characteristically jagged and interfingered with the trialuminide phase. This interfingering effect become magnified as interdiffusion progressed during oxidation testing. This progression of interfingering is illustrated in the photomicrographs FIGS. 4 through 6, and is particularly shown by a comparison of of FIGS. 4 and 5 with FIG. 6. FIGS. 4 through 6 show a trialuminide coating over a substrate of Alloy 2 (Cb-20Ta-15W-5Mo). FIG. 4 shows the as-coated substrate and coating in plain light enlarged 500 times. FIG. 5 shows the as-coated substrate and coating in polarized light enlarged 500 times. FIG. 6 also enlarged 500 times, shows the coating and substrate in plain light after oxidation for 100 hours at 2200° F.

Less complex, Ta-free trialuminides, comodified with tungsten and molybdenum only, did not exhibit the trialuminide-subaluminide interfingering, and appeared more like the structure shown in FIG. 1. It is also apparent that the modified coating (the coating on the Cb-20Ta-15W-5Mo alloy) of FIG. 5 exhibits a much finer columnar grain structure than does the unmodified columbium trialuminide ($CbAl_3$) of FIG. 1. Moreover, upon oxidation, the (Cb-20Ta-15W-5Mo) $Al_3$ coating developed numerous white particles dispersed in the $MAl_3$ matrix (where M represents the proportionate ingredients as they occur in the substrate). In accordance with the invention, these features—(1) interfingered subaluminides, (2) fine-grain structure, and (3) the existence of this particular dispersed phase—combined to effect greatly improved oxidation behavior, as will be set forth in more detail hereinafter.

Several of the specimens of modified trialuminide coatings were analyzed chemically using electron-beam-microprobe techniques. Analytical results for selected coatings and the substrates from which they were formed are presented in Table 2.

These data show that although proportionate reaction may be the rule (as exemplified by Ta, W, Mo, or Hf modification), in certain cases, substrate modifications of trialuminides may be either more effective (the case with vanadium) or less effective (the case with titanium) than would be presumed by assuming a proportionate reaction.

Thus vanadium generally produces a modification on the order of 1.4 times stoichiometric, while titanium produces a modification of only about 0.6 times stoichiometric. Such variations from proportionate modification are intended to be included within the term "substantially proportionate modification" as this term is used in the specification and claims.

Data such as these were thus of some importance in determining actual modification levels. In one instance (the vanadium modification) where a reliable analysis of subaluminide composition was obtained, it was determined that vanadium modification did not alter the expected phase relationships—the compound $(Cb-26V)_2Al$, analogous to $Cb_2Al$, was thus observed.

The compositions of the modified columbium aluminide coatings of the above-listed alloys, which are produced by modification of the columbium aluminides of the coatings with Ti (and optionally Cr, Mo or V) in amounts substantially proportionate to the amounts of these modifiers present in the substrates of the respective alloys, are set forth in Table 3, below. These coating compositions are based on stoichiometric $MAl_3$, assuming proportionate reaction, except for Ti and V, where factors of 0.6 times—and 1.4 times—stoichiometric, respectively, were used.

TABLE 2.—CHEMICAL ANALYSIS OF MODIFIED TRIALUMINIDE COATINGS

| Nominal substrate composition, weight percent | Area of analysis | Analytical results | | | | | | | | | | | | | | Analyzed composition |
|---|---|---|---|---|---|---|---|---|---|---|---|---|---|---|---|---|
| | | Cb | | Ta | | W | | Mo | | Ti | | V | | Hf | | Al | | |
| | | w/o | a/o | w/o | a/o | w/o | a/o | w/o | a/o | w/o | a/o | w/o | a/o | w/o | a/o | w/o | a/o | |
| Alloy: | | | | | | | | | | | | | | | | | | | |
| 2 ......... Cb-20Ta-15W-5Mo | Substrate | 61.2 | 73.9 | 21.5 | 13.3 | 13.1 | 7.9 | 4.2 | 4.9 | | | | | | | 0 | 0 | Cb-22Ta-13W-4Mo |
| | Coating | 34.2 | 16.9 | 11.0 | 2.8 | 5.8 | 1.5 | 3.6 | 1.7 | | | | | | | 45.4 | 77.2 | (Cb-20Ta-11W-7Mo)Al₃ |
| 4 ......... Cb-12Ti | Substrate | 89.6 | 82.3 | | | | | | | 10.4 | 17.7 | | | | | 0 | 0 | Cb-10Ti |
| | Coating | 52.4 | 24.8 | | | | | | | 3.3 | 3.0 | | | | | 44.4 | 72.3 | (Cb-6Ti)Al₃ |
| 21 ......... Cb-12V | Substrate | 90.2 | 83.5 | | | | | | | | | 9.8 | 16.5 | | | 0 | 0 | Cb-10V |
| | Subaluminide | 61.7 | 39.0 | | | | | | | | | 22.1 | 25.6 | | | 16.3 | 35.5 | (Cb-26V)₂Al |
| | Coating | 46.5 | 21.4 | | | | | | | | | 7.8 | 6.5 | | | 45.6 | 72.1 | (Cb-14V)Al₃ |
| 22 ......... Cb-33Hf | Substrate | 68.0 | 80.3 | | | | | | | | | | | 32.1 | 19.6 | 0 | 0 | Cb-32Hf |
| | Coating | 38.1 | 19.2 | | | | | | | | | | | 18.3 | 4.8 | 43.7 | 75.9 | (Cb-32Hf)Al₃ |

TABLE 3

| Alloy No.: | Nominal substrate composition, weight percent | Coating composition, weight percent |
|---|---|---|
| 1 | 100Cb | Cb-47Al |
| 2 | 60Cb-20Ta-15W-5Mo | 35Cb-11Ta-9W-3Mo-42Al |
| 3 | 97Cb-3Ti | 52Cb-1Ti-47Al |
| 4 | 88Cb-12Ti | 48Cb-4Ti-48Al |
| 5 | 77Cb-23Ti | 43Cb-7Ti-50Al |
| 6 | 50Cb-50Ti | 33Cb-14Ti-53Al |
| 7 | 25Cb-75Ti | 25Cb-20Ti-55Al |
| 8 | 70Cb-15Ti-15Mo | 38Cb-5Ti-9Mo-48Al |
| 9 | 55Cb-15Ti-30Mo | 30Cb-5Ti-17Mo-48Al |
| 10 | 60Cb-25Ti-15Mo | 35Cb-7Ti-8Mo-50Al |
| 11 | 45Cb-25Ti-30Mo | 26Cb-7Ti-17Mo-50Al |
| 12 | 69Cb-25Ti-6Cr | 37Cb-8Ti-4Cr-51Al |
| 13 | 62Cb-25Ti-13Cr | 34Cb-7Ti-7Cr-52Al |
| 14 | 46Cb-25Ti-29Cr | 23Cb-7Ti-15Cr-55Al |
| 15 | 69Cb-25Ti-6V | 37Cb-7Ti-4V-52Al |
| 16 | 44Cb-50Ti-6V | 27Cb-14Ti-5V-54Al |
| 17 | 38Cb-50Ti-12V | 22Cb-12Ti-10V-56Al |
| 18 | 66Cb-15Ti-13Cr-6V | 32Cb-5Ti-6Cr-4V-53Al |
| 19 | 50Cb-15Ti-29Cr-6V | 23Cb-4Ti-14Cr-4V-55Al |
| 20 | 39Cb-25Ti-30Cr-6V | 19Cb-6Ti-15Cr-4V-56Al |

Oxidation tests at 1300° F. demonstrated very significant improvement in the performance of Ti-containing columbium trialuminides. Pointedly, however, no benefit was obtained from singular additions of tungsten, molybdenum, iron, or nickel—elements that are electronegative with respect to columbium. Oxidation test results of examples of representative modified columbium trialuminide coatings are summarized in Table 4. From the information of Table 4 and related data, the following conclusions on improvement in 1300° F. oxidation performance of trialuminide coatings are evident:

TABLE 4.—BEHAVIOR OF VARIOUS MODIFIED COLUMBIUM TRIALUMINIDE COATINGS DURING CYCLIC OXIDATION IN AIR AT 1,300° F.

| Example Number | Nominal substrate composition, weight percent | Time to failure, hours | Total weight change during test, mg./cm.² | Mode of failure |
|---|---|---|---|---|
| 1 | Unmodified | 4.5 | −4.1 | Powdering. |
| 2 | 60Cb-20Ta-15W-5Mo | 20 | −67 | Do. |
| 3 | 97Cb-3Ti | 20 | −5.4 | General oxidation. |
| 4 | 88Cb-12Ti | 100 | −15 | Powdering. |
| 5 | 77Cb-23Ti | >100 | 0.73 | Unfailed. |
| 6 | 50Cb-50Ti | >100 | 0.04 | Do. |
| 7 | 25Cb-75Ti | >100 | −0.58 | Do. |
| 9 | 55Cb-15Ti-30Mo | >100 | 0.05 | Do. |
| 10 | 60Cb-25Ti-15Mo | >100 | −0.15 | Do. |
| 11 | 45Cb-25Ti-30Mo | >100 | 0.13 | Do. |
| 12 | 69Cb-25Ti-6Cr | 20 | −52 | Local defect; resisted powdering for 100 hr. |
| 13 | 62Cb-25Ti-13Cr | 3.0 | −0.47 | Do. |
| 14 | 46Cb-25Ti-29Cr | >100 | −0.22 | Unfailed. |
| 15 | 69Cb-25Ti-6V | >100 | 1.0 | Do. |
| 16 | 44Cb-50Ti-6V | >100 | 0.00 | Do. |
| 17 | 38Cb-50Ti-12V | >100 | −0.03 | Do. |
| 18 | 66Cb-15Ti-13Cr-6V | 4.5 | 0.44 | Local defect; resisted powdering for 100 hr. |
| 19 | 50Cb-15Ti-29Cr-6V | >100 | 0.36 | Unfailed. |
| 20 | 39Cb-25Ti-30Cr-6V | >100 | −0.07 | Do. |

1. Modification with 12 percent or less by weight of titanium is insufficient to eliminate powdering for as long as 100 hours. In amounts from 13 to 45 percent by weight, however, titanium modification of the trialuminide structure results in distinctly improved performance and creates a coating that is resistant to failure by both powdering and local defecting.

2. More complex coatings containing up to about 6 percent by weight of vanadium and larger amounts of both titanium and chromium proved decidedly advantageous in reducing powdering, although some tendency toward local defecting still remained.

3. Titanium in combination with vanadium, chromium or molybdenum exhibited a decidedly beneficial effect on 1300° F. oxidation performance. The most promising results were obtained when the titanium modification was at a level of at least 15 percent by weight.

The results of oxidation testing of several modified trialuminide coating compositions at 2200° F. are summarized in Table 5 below. Straight Ti-, and Ti-Cr-, Ti-V-, and Ti-Mo-modifications resulted in a greatly decreased propensity for the trialuminides to fail by localized defecting. Specimens of Alloys 1 through 9 and 11 through 20 were used for oxidation testing at 2200° F. as set forth in Table 5. From the results shown in Table 5 and related data the following conclusions may be drawn:

TABLE 5.—BEHAVIOR OF VARIOUS MODIFIED COLUMBIUM TRIALUMINIDE COATINGS DURING CYCLIC OXIDATION AT 2,200° F.

| Example Number | Nominal modification level, weight percent | Time to failure, hours | Total weight change during test, mg./cm.² | Mode of failure |
|---|---|---|---|---|
| 1 | Unmodified | 20 | 16 | Local defect. |
| 2 | 60Cb-20Ta-15W-5Mo | 75 | 3.8 | Do. |
| 3 | 97Cb-3Ti | 25 | 28 | Do. |
| 4 | 88Cb-12Ti | >100 | 3.0 | Unfailed. |
| 5 | 77Cb-23Ti | >100 | 1.9 | Do. |
| 6 | 50Cb-50Ti | 75 | 19 | General oxidation. |
| 7 | 25Cb-75Ti | 25 | 27 | Do. |
| 8 | 70Cb-15Ti-15Mo | >100 | 2.5 | Unfailed. |
| 9 | 55Cb-15Ti-30Mo | >100 | 3.1 | Do. |
| 11 | 45Cb-25Ti-30Mo | >100 | 2.3 | Do. |
| 12 | 66Cb-25Ti-6Cr | >100 | 2.9 | Do. |
| 13 | 62Cb-25Ti-13Cr | >100 | 8.7 | Do. |
| 14 | 46Cb-25Ti-29Cr | >100 | — | Oxide spalling. |
| 15 | 69Cb-25Ti-6V | >100 | 2.0 | Unfailed. |
| 16 | 44Cb-50Ti-6V | 50 | −16 | Oxide spalling. |
| 17 | 38Cb-50Ti-12V | 25 | −4.8 | Do. |
| 18 | 66Cb-15Ti-13Cr-6V | 75 | 9.2 | General oxidation. |
| 19 | 50Cb-15Ti-29Cr-6V | 75 | 14.3 | Do. |
| 20 | 39Cb-25Ti-30Cr-6V | 100 | −31 | Do. |

1. Straight Ti-modification of columbium aluminide coatings at the 3 percent by weight level is insufficient to effect the desired improvement. Within the range of from greater than 12 percent to about 45 percent by weight, however, Ti-modification eliminates localized defecting. At higher levels—45 percent to 50 percent and greater—Ti-modification is undesirable in that it seriously degrades the superior inherent high-temperature oxidation resistance of MAl₃-type coatings.

2. Comodification of trialuminide coatings with titanium and up to about 13 percent by weight of chromium also exhibited the desired inhibition of localized defect failures. At higher levels (29 percent), however, chromium seriously degrades the superior oxidation resistance of MAl₃ coatings. (Evidence of incipient degradation of oxidation resistance could be seen at the 13 percent level in the 25Ti-13Cr modification—weight gain of 8.7 mg./cm.² in 100 hours is borderline for the desired good oxidation behavior.)

3. Comodification of trialuminide coatings with titanium in combination with from 6 to 30 percent or more of molybdenum also proved effective in decreasing the propensity of trialuminides toward localized failure. No detrimental effects of molybdenum on oxidation behavior were observed at any level of modification examined.

4. Comodification of trialuminide coatings with titanium in combination with up to about 6 percent vanadium by weight gave good results. Vanadium comodification is desirable because of its distinct improvement of "low" (1300° F.) temperature behavior of $MAl_3$-type coatings. Vanadium can be tolerated in amounts through about 6 percent by weight when the coatings are modified with moderate amounts of titanium (e.g., 25Ti-6V), but greater amounts of comodifiers with vanadium tend to intensify the detrimental effects of vanadium at the 2200° F. temperature level (e.g., 15Ti-13Cr-6V and 15Ti-29Cr-6V). Thus, not more than an aggregate of about 25 percent Ti, Cr, Mo, and Mo-Ta should be present in the substrate to be aluminized (and correspondingly, not more than about 10 percent in the coating) when at least 3 percent V is also present in the substrate (i.e., 2 percent V in the coating).

In accordance with the invention, tests showed that singular modifications of trialuminide coatings with tantalum had no beneficial effect on the behavior of the coatings. However, tests on modified columbium trialuminide coatings formed by reaction with structural alloy substrates (Cb-Mo and Cb-W-Mo, with or without optional Ta or Hf) showed a marked improvement in performance attributable to the combination of molybdenum and tantalum. The beneficial effects of tantalum when used as a comodifier with molybdenum are shown by the data set forth in Table 6 below.

has been attributed, by electron-beam-microanalytical procedures, to stabilization of an oxidation-resistant molybdenum-rich $MAl_2$ subaluminide structure upon oxidation or diffusion depletion of the trialuminide. "Backup" oxidation resistance is thus inherently a feature of Ti-Mo-modified trialuminide coatings because of the interposition of the oxidation resistant $MAl_2$-phase that forms preferentially to nonoxidation resistant $Cb_2Al$ or $Cb_3Al$ upon moderate depletion of the $MAl_3$-type coating. Further comodification of trialuminides, such as, for example, by tantalum in addition to molybdenum and titanium, upon aluminizing a propitiously selected alloy substrate, achieves the additional new and useful benefits that accrue from mechanical interaction produced by interfingering of the $MAl_2$-$MAl_3$ boundary. This is illustrated in FIG. 6.

In summary, this invention is directed to protective coatings for columbium alloys, based on a modified columbium aluminide coating structure. The primary structure of the coating comprises a vapor-deposited columbium aluminide surface zone, but, in accordance with the invention, this surface zone is Ti-modified. As a result of such Ti-modification; the basic chemical and structural characteristics of the columbium aluminide coating are changed, and these changes result in a pronounced improvement in coating behavior at both "low" and "high" temperatures. In preferred embodiments of this invention, the Ti-modification is combined with Cr-, V-, Mo-, or Mo-Ta-modification. These preferred embodiments produce optimum results.

In brief, modification of basic columbium trialuminide coatings with the following elements and combinations of elements at the weight percent levels indicated are particularly effective in promoting significantly improved coating behavior TABLE 6.—BEHAVIOR OF VARIOUS TANTALUM-CONTAINING AND TANTALUM-FREE MODIFIED COLUMBIUM TRIALUMINIDE COATINGS DURING CYCLIC OXIDATION AT 2,200° F.

| Example Number | Nominal substrate composition, weight percent | Coating composition, weight percent | Time to failure, hours | Total weight change during test, mg./cm. | Mode of failure |
|---|---|---|---|---|---|
| 23 | 70Cb-20Ta-10Mo | 39Cb-11Ta-6Mo-44Al | 100 | 6 0 | Unfailed. |
| 24 | 61Cb-20Ta-19Mo | 34Cb-11Ta-11Mo-44Al | 100 | 5.8 | Do. |
| 25 | 55Cb-20Ta-20W-5Mo | 32Cb-12Ta-12W-3Mo-41Al | 50 | 1.03 | Local defect. |
| 26 | 55Cb-20Ta-15W-5Mo-5Hf | 32Cb-12Ta-9W-3Mo-3Hf-41Al | 75 | 4.2 | General oxidation. |
| 27 | 75Cb-20W-5Mo | 42Cb-11W-3Mo-44Al | 25 | 11.0 | Local defect [a] |
| 28 | 80Cb-10W-10Mo | 43Cb-6W-6Mo-45Al | 5 | 1.7 | Do. |
| 29 | 73Cb-17W-5Mo-5f | 40Cb-10W-3Mo-3Hf-44Al | 20 | 8 8 | Do. |

[a] Very severe cracking and spalling.

Aluminides formed from Ta containing alloys consistently resisted failure for more than twice as long as coatings formed from Ta-free substrates and vastly superior results were achieved with Mo-Ta modification. It is thus apparent that comodification of columbium trialuminide coatings with Mo-Ta is decidedly advantageous in inhibiting local defecting failure. Accordingly, in a most preferred form of this invention, the Cb-base substrate is comodified with Mo-Ta in addition to Ti, Ti-Cr, or Ti-V. The Mo:Ta ratio in alloys containing both of these modifiers can range from 1:2 to 2:1.

In accordance with the invention the desirable improvement in behavior achieved by Ti-, Ti-V-, Ti-Cr-, Ti-Mo-, an Ti-Mo-Ta-modified trialuminide coatings at 1300° F. and 2200° F. is attributed to the chemical and structural modification in the coatings effected by these elemental additions. Metallographic evidence shows gross "craze-cracking" (cyclic exposure at 1300° F.) of columbium trialuminide coatings not modified with these elements as contrasted with excellent retention of structural integrity in the trialuminide coatings modified in accordance with this invention. This evidence indicates that there is a significant improvement in mechanical compatibility of columbium aluminide coatings caused by the desirable chemical modifications taught by this invention.

Alteration of the coating structure by the Ti-, Ti-V-, Ti-Cr-, Ti-Mo-, and Ti-Mo-Ta-modifications, and the resulting achievement of equiaxed-grained coatings, is also believed to be a prominent factor in effecting the demonstrated improvement in performance by the coatings of this invention at both "low" and "high" temperatures.

Improvement in the high-temperature behavior of columbium trialuminides comodified with titanium and molybdenum at both "low" and "high" temperatures:

(13—45)Ti
(15—25)Ti-(up to 6)V
(20—35)Ti-(up to 13)Cr
(15—30)Ti-(up to 30)Mo
(15—25)Ti-(up to 40)Mo-Ta

In addition to the benefits accruing from chemical modifications with Ti, Ti-V, Ti-Cr, Ti-Mo, or Ti-Mo-Ta, important structural modifications are also achieved in which equiaxed structures are created. These equiaxed structures are much better able to resist stress induced failure than are the usual columnar structures characteristic of vapor-deposited columbium aluminide coatings.

Comodification of trialuminides with molybdenum as well as with titanium results in further desirable structural modification by stabilization of the oxidation-resistant $MAl_2$-type subaluminide phase.

Finally, Ta-containing trialuminide coatings, when comodified with Ti-Mo have superior oxidation behavior at elevated temperatures when compared with Ta-free coatings.

This improved performance achieved by comodification with tantalum is believed to be attributable to mechanical interlocking or interfingering of the modified trialuminide and the Ta-containing substrate. These improvements are not produced by either Ta modifications or Ti-Ta modifications alone, i.e., in the absence of Mo, and thus this benefit is dependent on the presence of both Ta and Mo.

The invention in its broader aspects is not limited to the specific details shown and described but departures may be made from such details within the scope of the accompanying claims without departing from the principles of the invention and without sacrificing its chief advantages.

We claim:

1. A composite article of manufacture comprising a substrate selected from the group consisting of Cb and Cb-base alloys; and a thermal-cyclic-failure resistant, defect-resistant, and broad range oxidation-resistant coating superimposed on said substrate and forming a surface zone thereon, said coating consisting essentially of columbium aluminide, predominantly in the trialuminide form, modified by combinations of modifying elements, in amounts by weight of the coating, selected from the group consisting of:

a. 5 to 10 percent of Ti, and an effective modifying amount of at least one metal modifier selected from the group consisting of Cr, V, and Mo, the maximum amount of each of said metal modifiers being 7 percent of Cr, 5 percent of V, and 20 percent of Mo; and b. 5 to 8 percent of Ti, and an effective modifying amount of at least one metal modifier selected from the group consisting of Cr, V, and Mo-Ta, the maximum amount of each of said metal modifiers being 7 percent of Cr, 5 percent of V, and up to 25 percent in the aggregate of Mo and Ta, the weight ratio of Mo to Ta being from about 1:2 to about 2:1; said coating containing not more than about 10 percent in the aggregate of Ti, Cr, Mo, and Ta when at least 2 percent V is present in said coating.

2. The article of claim 1 which consists essentially of columbium aluminide modified by from 6.3 to 10 percent of Ti and 4 to 7 percent of Cr.

3. The article of claim 1 which consists essentially of columbium aluminide modified by 5 to 8 percent of Ti and up to 5 percent of V.

4. The article of claim 1 which consists essentially of columbium aluminide modified by from 5 to 9 percent of Ti and from 8 to 17 percent of Mo.

5. The article of claim 1 which consists essentially of columbium aluminide modified by 5 to 8 percent of Ti and up to 24 percent in the aggregate of Mo and Ta.

6. A composite article of manufacture having good resistance to oxidation at elevated temperatures and resistance to cyclic fatigue failure, which article comprises:

A. a substrate having a composition by weight, selected from the group consisting of:

a. at least 45 percent Cb, 15 to 35 percent Ti, and an effective modifying amount of at least one metal modifier selected from the group consisting of Cr, V, and Mo, the maximum content of each of said selected metal modifiers in the substrate being 13 percent of Cr, 6 percent of V, and 35 percent of Mo; and b. at least 35 percent Cb, 15 to 25 percent Ti, and an effective modifying amount of at least one metal modifier selected from the group consisting of Cr, V, and Mo-Ta, the maximum content of each of said selected metal modifiers in the substrate being 13 percent of Cr, 6 percent of V, and up to 40 percent in the aggregate of Mo and Ta, the weight ratio of Mo to Ta being from about 1:2 to about 2:1; said substrate containing not more than about 25 percent in the aggregate of Ti, Cr, Mo, and Ta when at least 3 percent V is present in said substrate; and B. a thermal-cyclic-failure resistant, defect-resistant, and broad range oxidation-resistant coating superimposed on said substrate and forming a surface zone consisting essentially of columbium aluminide, predominantly in the trialuminide form, and modified by combinations of modifying elements, in amounts by weight of the coating, selected from the group consisting of:

a. 5 to 10 percent of Ti, and an effective modifying amount of at least one metal modifier selected from the group consisting of Cr, V, and Mo, the maximum amount of each of said modifier being 7 percent of Cr, 5 percent of V, and 20 percent of Mo; and b. 5 to 8 percent of Ti and an effective modifying amount of at least one metal modifier selected from the group consisting of Cr, V, and Mo, the maximum amount of each of said metal modifiers being 7 percent of Cr, 5 percent of V, and up to 25 percent in the aggregate of Mo and Ta, the weight ratio of Mo to Ta being from about 1:2 to about 2:1; said coating containing not more than about 10 percent in the aggregate of Ti, Cr, Mo, and Ta when at least 2 percent V is present in said coating, the coating being modified by Ti and the selected metal modifier in amounts substantially proportionate by weight to the amounts of these elements, respectively, in the substrate.

7. The article of claim 6 wherein said substrate consists essentially of 20 to 35 percent Ti, up to 13 percent Cr, balance essentially Cb.

8. The article of claim 7 wherein said substrate consists essentially of 20 to 35 percent Ti, 6 to 13 percent Cr, and balance essentially Cb.

9. The article of claim 8 wherein said substrate consists essentially of about 25 percent Ti, about 6 percent Cr, and balance essentially Cb.

10. The article of claim 8 wherein said substrate consists essentially of about 25 percent Ti, about 13 percent Cr, and balance essentially Cb.

11. The article of claim 6 wherein said substrate consists essentially of 15 to 25 percent Ti, up to 6 percent V, and balance essentially Cb.

12. The article of claim 11 wherein said substrate consists essentially of about 25 percent Ti, about 6 percent V, and balance essentially Cb.

13. The article of claim 6 wherein said substrate consists essentially of 15 to 25 percent Ti, up to 13 percent Cr, up to 6 percent V, and balance essentially Cb, the aggregate Ti and Cr present not exceeding about 25 percent by weight of said substrate.

14. The article of claim 6 wherein said substrate consists essentially of 15 to 30 percent Ti, up to 35 percent Mo and at least 45 percent Cb.

15. The article of claim 14 wherein said substrate consists essentially of 15 to 30 percent Ti, 15 to 30 percent Mo, and at least 45 percent Cb.

16. The article of claim 15 wherein said substrate consists essentially of about 15 percent Ti, about 15 percent Mo, and balance essentially Cb.

17. The article of claim 15 wherein said substrate consists essentially of about 15 percent Ti, about 30 percent Mo, and balance essentially Cb.

18. The article of claim 15 wherein said substrate consists essentially of about 25 percent Ti, about 30 percent Mo, and balance essentially Cb.

19. The article of claim 15 wherein said substrate consists essentially of about 25 percent Ti, about 15 percent Mo, and balance essentially Cb.

20. The article of claim 6 wherein said substrate consists essentially of 15 to 25 percent Ti, up to 40 percent in the aggregate of Mo and Ta, the weight ratio of Mo to Ta in said substrate being from about 1:2 to about 2:1, and balance essentially Cb.